US010718850B1

(12) United States Patent
Slocum

(10) Patent No.: US 10,718,850 B1
(45) Date of Patent: Jul. 21, 2020

(54) FUSION BETWEEN AOA AND TDOA

(71) Applicant: BAE Systems Information and Electronic Systems Integration Inc., Nashua, NH (US)

(72) Inventor: Dean C. Slocum, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 43 days.

(21) Appl. No.: 16/212,165

(22) Filed: Dec. 6, 2018

(51) Int. Cl.
*G01S 5/02* (2010.01)

(52) U.S. Cl.
CPC .......... *G01S 5/0268* (2013.01); *G01S 5/0294* (2013.01)

(58) Field of Classification Search
CPC .......... G01S 13/4472; G01S 3/26; G01S 5/12; G01S 5/02685; G01S 5/0294; F42B 12/20; F42C 13/04
See application file for complete search history.

(56) References Cited

U.S. PATENT DOCUMENTS

| 9,739,878 B2 | 8/2017 | Gudim et al. |
| 2008/0167835 A1 | 7/2008 | Zank et al. |
| 2016/0305755 A1 | 10/2016 | Edwards |

FOREIGN PATENT DOCUMENTS

| WO | 2009045573 A1 | 4/2009 |
| WO | 2014093400 A1 | 6/2014 |

OTHER PUBLICATIONS

International Search Report, PCT/US2019/064467, dated Feb. 21, 2020, 8 pages.

*Primary Examiner* — Sonji N Johnson
(74) *Attorney, Agent, or Firm* — Sand, Sebolt & Wernow LPA; Scott J. Asmus

(57) ABSTRACT

A navigation system for a swarm of guided projectiles, such as cruise missiles, having three or more projectiles launched at a target is provided. The projectiles can be in secure communication with one another and can operate as a single swarm using a fusion of angle of arrival and time difference of arrival of a detected signal to direct the projectiles to a point of impact on a target that is offset from an emitter generating the detected signal. The projectiles can further use knowledge of their relative position to maintain and/or adjust their flight path and/or speed to maintain their course to the point of impact in areas of GPS denial or unavailability.

20 Claims, 7 Drawing Sheets

FUSION BETWEEN AOA AND TDOA

BACKGROUND

Technical Field

The present disclosure relates generally to navigation systems for guided projectiles. More particularly, the present disclosure relates to an enhanced navigation system for cruise missiles that can geolocate a target and adjust the flight path of a missile according to the geolocation and estimated target movements. Specifically, the navigation system can continuously geolocate a target and can share that information across multiple projectiles fired simultaneously at a common target.

Background Information

Current navigation systems, particularly those used with guided munitions such as a cruise missile, allow a projectile to be fired against a target and guided to that target using the geolocation of an emitter collocated with that target. Presently, guided munitions include an antenna or a sensor array that can detect emitter pulses, and a processor that can use the detected pulses to calculate an angle off of the nose (azimuth) and an angle up or down from the nose (elevation) between the munition and the emitter. Using these two angles, the projectile can determine the location (latitude and longitude) of the emitter and adjust its flight path and/or flight speed to direct the projectile to its target.

The present systems allow for a single projectile or missile to be fired at a single target which increases the potential for a missed target strike such that a minor error or miscalculation in geolocation, flight path, flight speed, or targeting profile can cause a single missile to miss its target. Further, when targets are mobile, the movement of the target can affect the flight path of the projectile such that the target may be able to maneuver away from or confuse a single missile or single projectile again causing a missed target strike.

Additionally, some targets employ active navigation countermeasures, such as global positioning system (GPS) denial, in an area surrounding the target which can cause a single projectile to lose access to part of its navigation system, i.e., GPS. In these instances, these projectiles fall back to unaided inertial navigational systems using equipment such as accelerometers and gyroscopes which are prone to drift, causing the missile to veer off course over time and distance. The larger the area of GPS denial surrounding a target, the further off course a projectile can drift, again potentially resulting in a missed target strike.

Finally, current single projectile missile systems that can detect the emission of radar or radio pulses from the target are guided by these pulses directly to the emitter. Typically, the emitter is offset from the desired point of impact on the target, and a direct strike on the emitter may or may not result in a strike at the desired location on the target. Using one example, when the target is a ship at sea, the emitter may be located at the top of a communications tower and striking the emitter with a projectile may destroy or hamper communications or detection systems of the target, but may not disable the target or its offensive or defensive capabilities.

For these reasons above, current practice is often to fire multiple missiles simultaneously at the same target, each with its own navigation system to direct the missile at the target and each with the same issues discussed above.

SUMMARY

Accordingly, issues continue to exist relating to accuracy of missile navigation systems, specifically hitting a location on a target that is offset from the geolocated target emitter and operating in a GPS (or other navigation aid) denied environments. The present disclosure addresses these and other issues by providing a multiple projectile navigation system which may be used to increase the accuracy of geolocation, can accommodate an offset of the desired impact point from the geolocated target emitter, and can eliminate the impact of navigation system drift within areas of GPS or other navigation aid denial. The present disclosure may further provide for a navigation system that allows multiple projectiles to communicate amongst themselves and operate in unison to reach a common target simultaneously.

In accordance with one aspect, an embodiment of the present disclosure may provide a method of projectile navigation comprising: detecting an incoming signal originating from an emitter carried by a target, wherein the incoming signal is independently detected by each of at least three projectiles that are operable to travel to and impact the target; analyzing the incoming signal via a processor and at least one non-transitory storage medium carried by at least one of the at least three projectiles to provide the angle of arrival (AOA) for the incoming signal relative to the location of each projectile; analyzing the incoming signal via the processor and at least one non-transitory storage medium to provide the time of arrival (TOA) of the incoming signal relative to the location of each projectile; communicating the AOA and TOA between the at least three projectiles; and, determining the geolocation of the target based on the AOA and TOA of the incoming signal. This exemplary embodiment or another exemplary embodiment may further provide wherein the at least three projectiles are three long-range anti-ship missiles (LRASMs). This exemplary embodiment or another exemplary embodiment may further provide wherein analyzing the detected signal data to provide the AOA further comprises: applying a correlative interferometry direction finding (CIDF) process to the incoming signal data to provide the AOA of the detected signal. This exemplary embodiment or another exemplary embodiment may further provide wherein determining the geolocation of the target based on the AOA and TOA of the incoming signal comprises: processing the AOA and TOA measurements with at least one Kalman filter to geolocate the target. This exemplary embodiment or another exemplary embodiment may further provide adjusting at least one of the flight path and flight speed of one or more of the at least three projectiles based on the geolocation of the target. This exemplary embodiment or another exemplary embodiment may further provide simultaneously analyzing the incoming signal data to provide the AOA and TOA. This exemplary embodiment or another exemplary embodiment may further provide independently analyzing the incoming signal data to provide the AOA and TOA in any order. This exemplary embodiment or another exemplary embodiment may further provide creating a profile of the target prior to launching the projectiles. This exemplary embodiment or another exemplary embodiment may further provide comparing the profile to a database of known target types and configurations to determine a point of impact on the target relative to and offset from the location of the signal emitter carried by the target. This exemplary embodiment or another exemplary embodiment may further provide communicating the target profile, target configuration, and point of impact to the projectiles. This exemplary embodiment or another exemplary embodiment may further provide determining a direction of travel and speed of the target based on the AOA and TOA of the detected signal and the geolocation of the target. This exemplary embodiment or another exemplary embodiment may further provide wherein each of the projectiles navigate by unaided inertial navigational systems in areas where global positioning system (GPS) data is unavailable or denied. This exemplary embodiment or another exemplary embodiment may further provide measuring one or both of the transmission and receiving times of communication pulse transmissions between the projectiles. This exemplary embodiment or another exemplary embodiment may further provide comparing the transmission and receiving times of communication pulse transmissions between the projectiles; and, determining the position of each of the projectiles relative to each of the other projectiles. This exemplary embodiment or another exemplary embodiment may further provide adjusting at least one of the flight path and flight speed of at least one of the projectiles to allow each of the projectiles to arrive at the target at approximately the same time.

In accordance with another aspect, an embodiment of the present disclosure may provide a system comprising: a processor capable of executing logical functions; and at least one non-transitory computer readable storage medium having instructions encoded thereon that, when executed by the processor, implements operations to direct the operations of at least three projectiles, the instructions including: detect an incoming signal originating from an emitter carried by the target, wherein the incoming signal is independently detected by each of the projectiles; analyze the incoming signal to provide the angle of arrival (AOA) for the incoming signal relative to the location of each projectile; analyze the incoming signal to provide the time of arrival (TOA) of the incoming signal relative to the location of each projectile; communicate the AOA and TOA between the at least three projectiles; and, determine the geolocation of the target based on the AOA and TOA of the incoming signal. This exemplary embodiment or another exemplary embodiment may further provide wherein the instructions further include: apply a correlative interferometry direction finding (CIDF) process to the incoming signal data to provide the AOA of the detected signal; process the AOA and TOA measurements with at least one Kalman filter to geolocate the target; create a profile of the target; compare the profile to a database of known target types and configurations to determine a point of impact on the target relative to and offset from the location of the signal emitter carried by the target; communicate the target profile, target configuration, and point of impact to the projectiles; determine a direction of travel and speed of the target based on the AOA and TOA of the detected signal and the geolocation of the target; measure one or both of the transmission and receiving times of communication pulse transmissions between the projectiles; compare the transmission and receiving times of communication pulse transmissions between the projectiles; and, determine the position of each of the projectiles relative to each of the other projectiles. This exemplary embodiment or another exemplary embodiment may further provide wherein the instructions further include: adjusting at least one of the flight path and flight speed of at least one of the projectiles to allow each of the projectiles to arrive at the target at approximately the same time based on one or more of the target's geolocation, the target's direction of travel and speed, and the position of each of the projectiles relative to each of the other projectiles.

In accordance with another aspect, an embodiment of the present disclosure may provide a computer program product including one or more non-transitory machine-readable mediums encoding instructions that when executed by one or more processors cause a process to be carried out for directing at least three projectiles, the process comprising: detecting an incoming signal originating from an emitter carried by the target, wherein the incoming signal is independently detected by the projectiles; analyzing the incoming signal to provide the angle of arrival (AOA) for the incoming signal relative to the location of each projectile; analyzing the incoming signal to provide the time of arrival (TOA) of the incoming signal relative to the location of each projectile; communicating the AOA and TOA between the at least three projectiles; and, determining the geolocation of the target based on the AOA and TOA of the incoming signal. This exemplary embodiment or another exemplary embodiment may further provide wherein the process further comprises: apply a correlative interferometry direction finding (CIDF) process to the incoming signal data to provide the AOA of the detected signal; process the AOA and TOA measurements with at least one Kalman filter to geolocate the target; create a profile of the target; compare the profile to a database of known target types and configurations to determine a point of impact on the target relative to and offset from the location of the signal emitter carried by the target; communicate the target profile, target configuration, and point of impact to the projectiles; determine a direction of travel and speed of the target based on the AOA and TOA of the detected signal and the geolocation of the target; measure one or both of the transmission and receiving times of communication pulse transmissions between the projectiles; compare the transmission and receiving times of communication pulse transmissions between the projectiles; determine the position of each of the projectiles relative to each of the other projectiles; and adjusting at least one of the flight path and flight speed of at least one of the projectiles to allow each of the projectiles to arrive at the target at approximately the same time based on one or more of the target's geolocation, the target's direction of travel and speed, and the position of each of the projectiles relative to each of the other projectiles.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
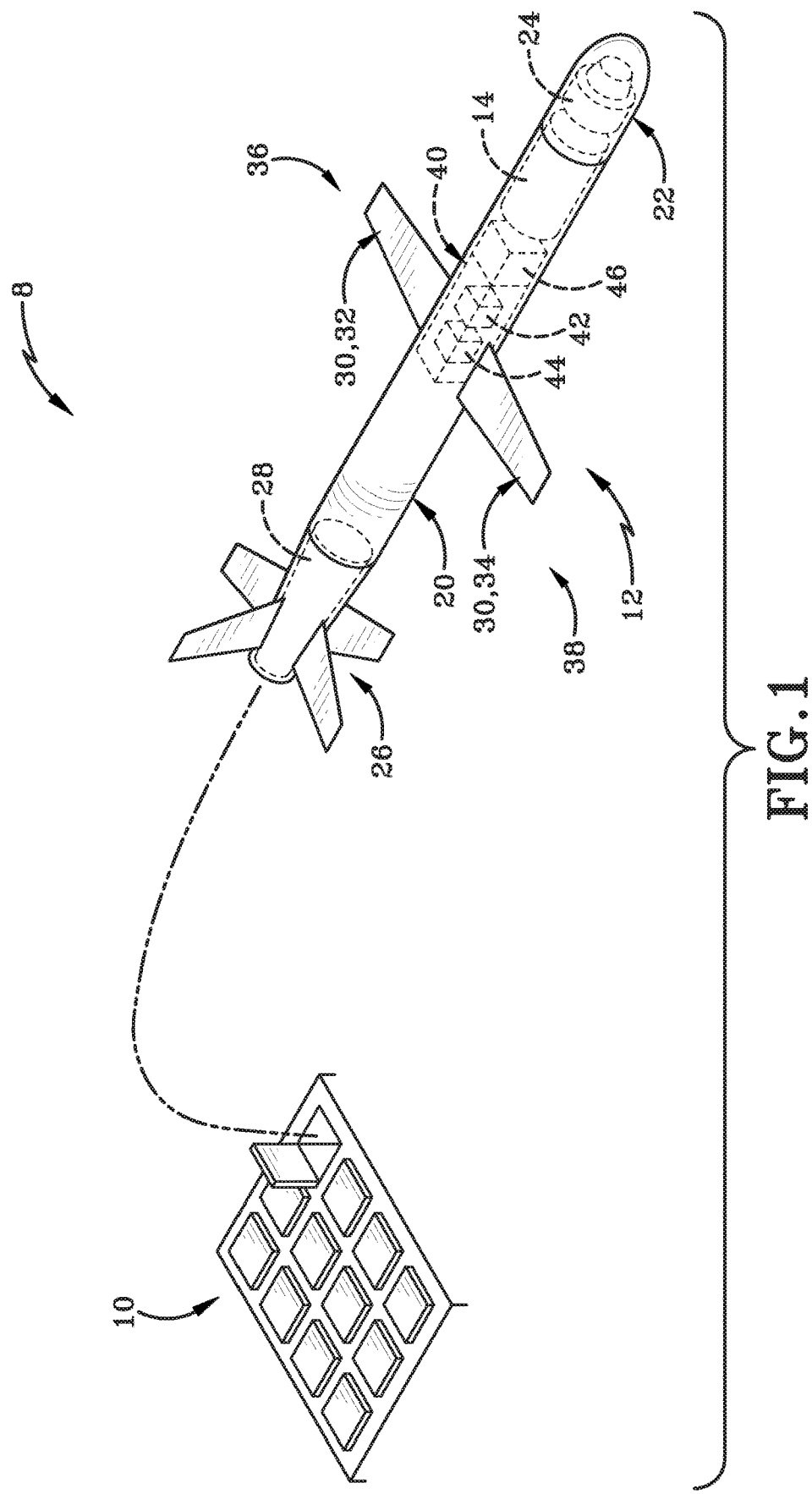
FIG. 1 is a pictorial view of an embodiment of a cruise missile and firing platform in accordance with one aspect of the present disclosure.

A navigation system 8 for a guided projectile is shown and provided herein. As discussed further herein, a guided projectile can be a missile or cruise missile, such as a long-range anti-ship missile (LRASM). It will be understood that the navigation system provided herein may be applied to other guided munitions or projectiles, aircraft, both manned or unmanned, or other systems utilizing navigational aids. As further described herein, navigation system 8 relates to targeting of enemy vehicles, aircraft, ships, and/or stationary installations. It will be further understood that the targets described herein may be mobile or stationary and may be known or unknown as further discussed below.

Current navigation systems used with cruise missiles generally rely on radar pulses or radio frequency pulses from an emitter on a target. The general location of the target may be determined by a firing platform of a missile prior to firing. In such implementations, target data may be uploaded to the missile's internal guidance system before the missile is released from the firing platform.

In some aspects, the present system discussed herein can be utilized with single missile systems. However, as discussed throughout, it will be understood that the present system is generally directed at multiple missile systems, unless specifically indicated herein.

The present navigation system 8 includes a firing platform 10, at least one guided projectile, such as a LRASMs 12, having an internal guidance system 14. The navigation system 8 further includes an emitter 18 collocated with a target 16.

With reference to FIG. 1, firing platform 10 can be any suitable firing structure capable of housing and launching LRASM 12. According to one aspect, firing platform 10 can be a ship, including a surface ship or a submarine. According to another aspect, firing platform 10 may be a land-based or sea-based vehicle or an aircraft. According to another aspect, firing platform 10 may be a land-based permanent or semi-permanent installation capable of housing and launching LRASM 12.

An individual LRASM 12, as shown in FIG. 1, can include an internal guidance system 14, a body 20, a nose 22, a sensor array 24, a tail section 26, an engine 28, and a wing structure 30. Nose 22 can be spaced apart from tail section 26 therebetween defining a longitudinal direction. Wing structure 30 may include a left wing 32 and a right wing 34 disposed on a left side of side 36 and right side 38 of body 20 of LRASM 12 and may therebetween define a horizontal direction. According to one aspect, wing structure 30 and/or wings 32, 34 can be moveable between a stowed position (not shown) and a deployed position (as seen in FIG. 1).

Internal guidance system 14 may include one or more accelerometers and gyroscopes, as well as satellite guidance and/or navigation components. According to one aspect, internal guidance system may utilize a global positioning system (GPS) sensor within sensor array 24, as discussed below, to aid in navigation. According to another aspect, internal guidance system 14 may receive communications from computer 40 and thereby direct the flight path of LRASM 12, as discussed further herein.

Body 20, nose 22, tail section 26, and wing structure 30 may be operationally connected to form a hull or outer shell of LRASM 12 and may aid in the flight thereof according to normal operational properties thereof as well as serve as a protective covering containing other listed components therein, as illustrated in FIG. 1. Tail section 26 may further include one or more fins to further aid in the flight and navigation of LRASM 12 according to normal operational properties thereof.

Sensor array 24 may include one or more antennas and/or an antenna array, a GPS sensor or other satellite navigation sensors, infrared and/or other focal plane array sensors, cameras, or any other sensors that are desirable for the desired implementation. According to one aspect, sensor array 24 may include an antenna array having one or more antennas that are optimized to detect radio signals originating from an emitter 18 of a target 16, and a GPS sensor, as discussed further herein.

Engine 28 can be wholly contained within LRASM 12 and can be a known engine 28 type capable of providing thrust and propulsion of LRASM 12. Engine 28 may further include a fuel source or fuel tank for operational use thereof. It will be understood that although discussed with the LRASM embodiment, engine 28 can vary depending on the guided projectile used with system 8, and can be chosen by a person of skill according to the specific implementation parameters.

LRASM 12 may further include an onboard computer 40. Computer 40 may include a processor 42 coupled with a memory or at least one non-transitory computer readable storage medium 44. Computer 40 may be connected to internal guidance system 14, sensor array 24, engine 28, and wing structure 30, including left and right wings 32 and 34. According to one embodiment, computer 40 may be in serial connection with internal guidance system 14, sensor array 24, engine 28, and wing structure 30, including left and right wings 32 and 34. Computer 40 may further include a communications link 46 which can be a wireless communications link 46 and can link LRASM 12 with firing platform 10. According to another embodiment, communications link 46 may link LRASM 12 with a control center or control computer located remote from firing platform 10. Communications link 46 may further allow communication between multiple LRASMs 12A-C fired simultaneously or concurrently and can allow LRASMs 12A-C to act in a swarm, as discussed further herein.

According to one aspect, computer 40 can be or include a logic controller, a series of logics or logic controllers, a microprocessor, or the like that can store and/or execute the process or processes disclosed herein. According to another aspect, computer 40 can further store and/or execute other functions of LRASM 12, including but not limited to, wing 32, 34 deployment, engine 28 operation, and/or flight path adjustments.

Figure 2:
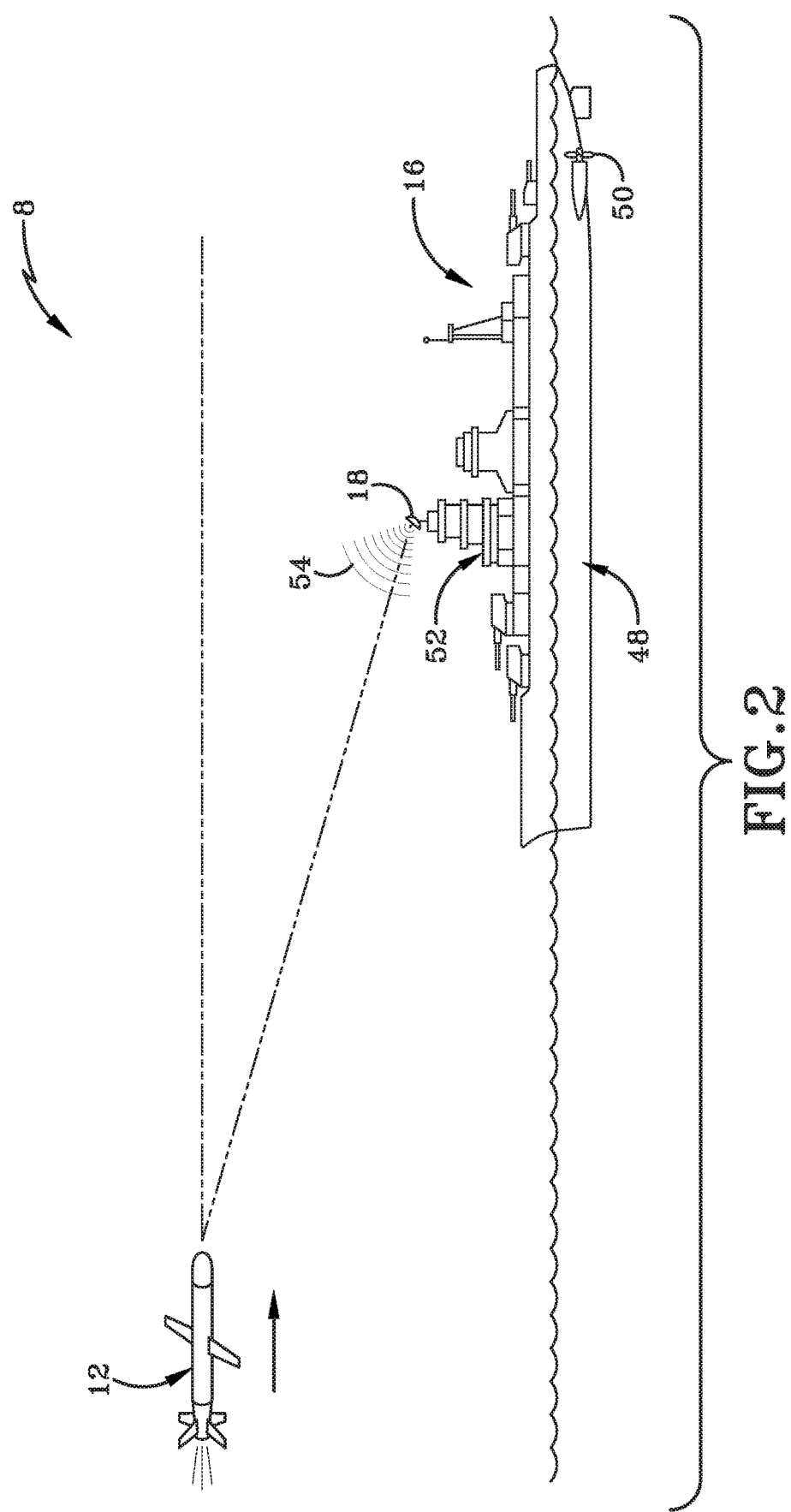
FIG. 2 is a side elevation view of an embodiment of a cruise missile and target in accordance with one aspect of the present disclosure.
Figure 3:
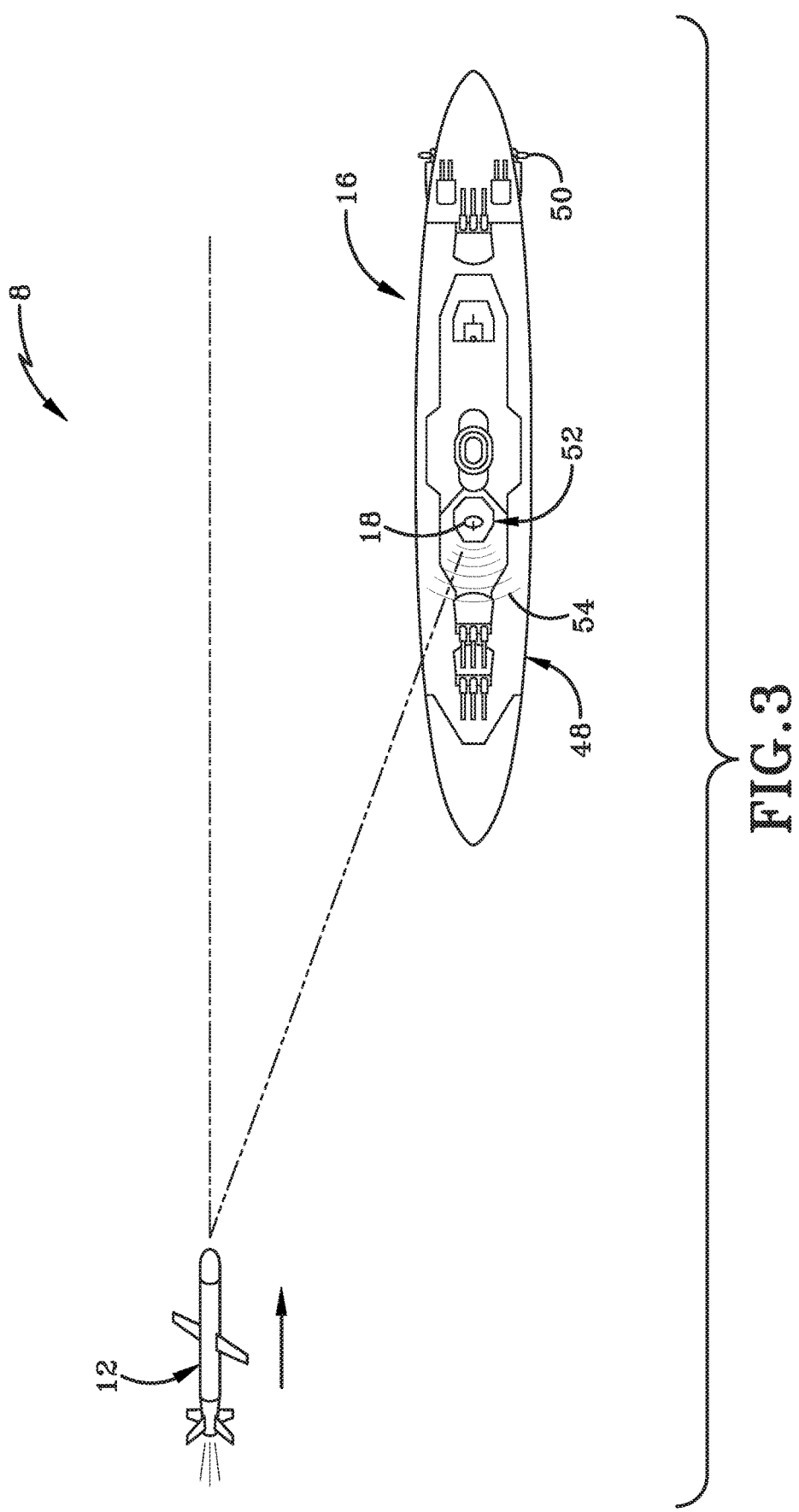
FIG. 3 is a top elevation view of an embodiment of a cruise missile and target in accordance with one aspect of the present disclosure.

With reference to FIGS. 2 and 3, target 16 can include emitter 18 therewith. Target 16 can further include a body 48, a propulsion mechanism 50, and a communications structure 52 thereon.

As further used herein, target 16 refers to the entirety of the structure, including the features listed above. This can be distinguished from one or more "points of impact" as discussed further herein, as a point of impact is a specific location on target 16. By way of one non-limiting and simplified example, a target 16 can be a ship while a point of impact can be the hull of that same ship adjacent an engine room within that same ship.

Further, it will be understood that although target 16 is shown and discussed herein as a ship, target 16 can similarly be any vehicle or structure, including mobile vehicles that are land or sea-based, such as tanks, trucks, trains, and the like. According to another aspect, target 16 may be a manned or unmanned aircraft.

Emitter 18 may be an antenna or antenna array capable of generating and broadcasting a signal outward therefrom. According to one aspect, emitter 18 may be a radio antenna or radio array operable to generate and broadcast a radio signal therefrom. According to another aspect, emitter 18 may be a radar antenna or array. According to another aspect, emitter 18 may include more than one emitter type capable of generating and broadcasting multiple signals across one or more electromagnetic frequency bands. For example, emitter 18 may include a radio or communications array that can broadcast in normal radio frequencies while also including a radar antenna or array that can generate and receive radar waves for use in navigation, target acquisition and tracking, and/or threat detection and avoidance.

In use of the non-limiting example of target 16 as a ship, body 48 of target can then refer to the main hull and deck of the ship. Further keeping with this example, propulsion mechanism 50 of target 16 may include an engine and one or more propellers or propulsion structures.

Communications structure 52 can be a tower or other similar structure that can support one or more emitters 18 of the type the present system 8 can detect. Communications structure 52 may be a portion of body 48, or may form a separate structure thereon or attached thereto.

Therefore, as used herein, the term "collocate" and all its forms shall be given its ordinary meaning as a transitive verb meaning to arrange something so that it is next to or close to something else. Thus, an emitter 18 collocated with target 16 simply refers to the arrangement wherein the emitter 18 is near or close to the target 16. In keeping with the example of target 16 as a ship, emitter 18 may be collocated with target 16 by way of being mounted on communications structure 52, which is in turn connected to the body 48 of the ship, i.e. target 16. Thus, the emitter 18 would be considered to be collocated with target 16 due to the close arrangement thereof.

Having thus described the elements of the present navigation system 8, the operation, use, and advantages thereof will now be discussed.

With reference to FIGS. 2 and 3, LRASM 12, having been launched from firing platform 10, can utilize sensor array 24 to detect a signal 54 from an emitter 18. With present systems, the signal may typically be a radar pulse coming from emitter 18 whereas emitter 18 is collocated with target 16, but has an unknown location relative to LRASM 12. LRASM 12 can detect the signal 54, or more particularly the phase and amplitude of the signal 54 to determine an angle of arrival (AOA) utilizing a known process referred to as direction finding (DF). The DF process can determine the AOA of a signal by comparing the characteristics of an incoming signal to a database of expected signal characteristics for a given array structure and size. According to one aspect, the DF process can be a known DF process such as a correlated interferometry direction finding process (CIDF process).

Determining the AOA of a detected signal may further involve determining two angles of the emitter 18 relative to LRASM 12. Specifically, AOA can be comprised of 1) the angle off of the nose 22 of LRASM 12 around the horizontal and 2) the vertical angle of the target 16 relative to the LRASM 12. The vertical angle is known as elevation, and is depicted in FIG. 2 while the horizontal angle off of the nose is known as azimuth and is depicted in FIG. 3.

Where target 16 is a ship, target 16 is thus known or assumed to be at the surface of the water in which it is afloat; therefore, as the elevation of the LRASM 12 is known, the elevation angle to determine the AOA may be represented as a negative elevation off the nose 22 of the LRASM 12, as seen in FIG. 2.

In operation, LRASM 12 may detect signal 54 using sensor array 24 to determine the angle of elevation relative to the position of the nose 22 of LRASM 12. This elevation angle may be calculated through the application of a known DF process, which can be stored on storage medium 44 and/or executed by computer 40 and/or processor 42.

With regards to azimuth, and in reference to FIG. 3, target 16 may be at any angle around the horizontal relative to LRASM 12, therefore azimuth may be represented as a directional vector at any angle from 0-360 degrees around LRASM 12.

The azimuth angle of the target may likewise be determined by the signal 54 hitting sensor array 24 of LRASM 12. The signal data, specifically phase and amplitude difference data, can be sent through a serial connection from sensor array 24 to processor 42 where the data can be processed using a direction finding process such as CIDF to provide an azimuth direction of the emitter 18 relative to the LRASM 12.

Figure 4:
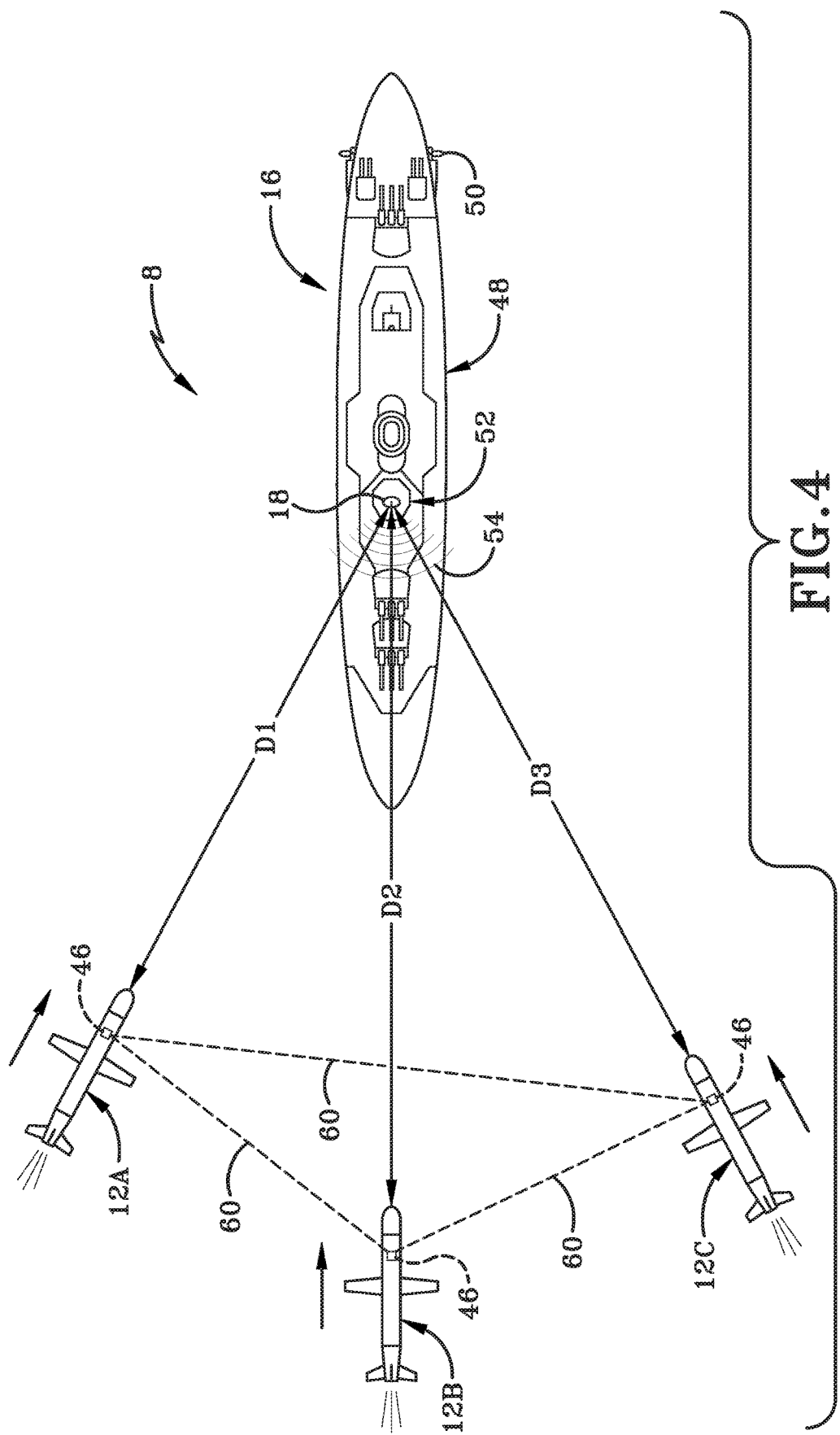
FIG. 4 is a top elevation view of an embodiment in accordance with one aspect of the present disclosure utilizing three cruise missiles.

With reference to FIG. 4, time difference of arrival (TDOA) may also be used to locate an emitter 18 carried by a target 16. Specifically, TDOA requires three or more LRASMs 12 (individually numbered as 12A, 12B, and 12C in FIG. 4) to be fired at a common target and traveling at a distance apart. TDOA can provide a geolocation of target 16 through the detection of signal 54 by determining the time of arrival (TOA), or more particularly the difference in time, at which the signal is detected by each individual LRASM 12 fired at the common target.

With the LRASMs 12A-C traveling to the target 16 from different locations due to their relative spacing, each LRASM 12A-C is likely to be at a different distance to the target at any given point during their flight. These different distances are indicated in FIG. 4 as $D_1$, $D_2$, and $D_3$. The difference in distance to the target 16 and the emitter 18 affects the time at which the signal 54 reaches the sensor array 24 of each individual LRASM 12A-C. The difference in time at which the signal 54 is received by each LRASM 12A-C can be processed by a Kalman filter to geolocate the emitter 18. Because TDOA operates in 3-D space, three receivers, in this case, three LRASMs 12A-C with separate sensor arrays 24, are required to geolocate the target emitter. In systems using more than three missiles, the geolocation accuracy increases with each additional missile. However, using more than three missiles may not be cost effective and the increased geolocation accuracy may not be justified in that cost. Conversely, using two missiles can provide a TDOA measurement; but a TDOA measurement between only two missiles is not sufficient to geolocate the target emitter.

The present navigation system 8 therefore is contemplated for use with three LRASMs 12A-C concurrently launched from one or more firing platforms 10 and directed at a common target 16. The three LRASMs 12A-C may work together in a coordinated swarm. The present system 8 can combine the calculations of AOA and TDOA to increase accuracy of each individual LRASM 12A-C as it is directed to target 16, thereby increasing the probability of a successful strike on target 16. The present system further contemplates that communication link 46 of each LRASM 12A-C can allow communications between each LRASM 12A-C such that all three missiles can share information detected by each of the other LRASMs 12A-C to further increase accuracy.

According to one aspect, each of the three LRASMs 12A-C may be in secure communication with each other and/or with a command computer and/or processor remote from the LRASMs 12A-C which may or may not be collocated with firing platform 10 such that data can be transmitted in real time communications between missiles and the command processor. According to this aspect, the AOA and TOA measurements may then be communicated to and/or between LRASMs 12A-C via communications link 46. Communications and/or data streams are illustrated in the figures as dashed lines between the LRASMs 12A-C and are further referenced herein as data 60, or alternatively, shared data 60. Further according to this aspect, a Kalman filter installation may be utilized to determine the geolocation of target 16 and emitter 18. This single Kalman filter may be installed on one of the LRASMs 12A-C or may alternatively be installed on a central processor remote there from. By way of one non-limiting example, LRASMs 12B and 12C may generate elevation, azimuth, (i.e. AOA) and TOA measurements, and send these measurements to LRASM 12A via communications link 46. This data 60 may be received by LRASM 12A, which may combine this data with its own TOA and AOA measurements. This combined data set may then be processed by a Kalman filter encoded on memory 44 of LRASM 12A to generate a geolocation solution. LRASM 12A may communicate the results back to LRASMs 12B and 12C via communications link 46. According to another example, all three LRASMs 12A-C may communicate data 60 to a remote computer which may apply the Kalman filter to generate a geolocation solution, and may communicate the solution back to LRASMs 12A-C. According to another example, all three LRASMs 12A-C may independently perform these processes using data 60 from each of the other two LRASMs 12A-C. According to this example, if the communications to one of LRASMs 12A-C were to be lost, the other two could continue autonomously without the third as each LRASM 12A-C would be equipped with its own solution.

This fusion of AOA and TDOA, as discussed above, may allow a higher level of accuracy over either AOA or TDOA alone. By way of one non-limiting example, a single projectile launched at a moving target may have a probability of hitting the desired point of impact on that target of approximately 60% using AOA alone. A group of three projectiles may have a probability of hitting the desired point of impact on the target of approximately 80% using TDOA alone. The fusion of AOA and TDOA according to the above process can significantly increase the probability of hitting the desired point of impact on the target. According to one aspect, the fusion of AOA and TDOA according to the present system 8 can increase the probability of hitting the desired point of impact on the target up to approximately 98%.

Additionally, the fusion of AOA and TDOA can generate a geolocation of the target 16 using incomplete information by readily and seamlessly switching between AOA alone, TDOA alone, or the fusion of AOA and TDOA, depending on what information is available at the time of a given scan. For example, TDOA may require three LRASMs 12 to determine the point of origin for signal 54. Should one or more of the three LRASMs 12 be malfunctioning, damaged, or otherwise taken out of service, such as being shot down by enemy defenses, the present navigation system 8 can operate using AOA alone. Similarly, should the AOA result be unreliable or otherwise unavailable, the present navigation system 8 can seamlessly continue to operate using just TDOA results to provide a geolocation. Subsequent scans can fill in missing information as it again becomes available.

In real world applications, target 16 is often mobile meaning the geolocation of emitter 18 and target 16 can change over time. Therefore, these calculations may be run on a continuous and/or systematic basis. Thus, each time signal 54 is detected by LRASMs 12, the signal data is captured and communicated to the computer 40 and/or processor 42 running one or more Kalman filters, CIDF, and/or other DF processes, for updated geolocation information. Once geolocation is determined, the present geolocation of the target 16 may be used by the internal guidance system 14 of LRASMs 12A-C to adjust their flight paths and/or flight speed by operation of wing structure 30, engine 28 or both. Having continuous and/or systematic measurements taken over a period of time can give both speed and direction of target 16 and emitter 18 thereby allowing computer 40 and/or processor 42 to predict the geolocation of target 16 at the predicted time of impact of LRASMs 12A-C to further adjust flight path and/or speed of LRASMs 12A-C to intercept target 16 at the predicted geolocation.

The communication link 46 between LRASMs 12A-C can allow further navigational adjustments based on the relative position of each LRASM 12A-C to its counterparts during flight. Specifically, the inclusion of three or more LRASMs 12A-C in secure communication can allow LRASMs 12A-C to communicate their position on a continuous basis both relative to target 16 and relative to each other, thus providing significant advantages over current single missile systems.

Specifically, the fusion of AOA and TDOA may provide highly accurate targeting information relating to the position of an emitter 18 collocated with a target 16. In many instances, the emitter 18 is carried on a portion of the target, or on a structure attached to the target 16. However, the emitter 18 may not actually be the desired point of impact. In accordance with a ship as a non-limiting example of the target 16, the emitter 18 may be on a communications tower or communications structure 52 at one end of a ship and a direct strike on the emitter 18 or communications structure 52 may not sufficiently disable the propulsion or offense and defense capabilities of the target 16. Instead, a direct hit on the emitter 18 may only knock out that particular communications structure 52. Further, as many modern military units tend to have redundant systems, a direct strike on emitter 18 may not even disable communications, targeting, or defensive capabilities provided by the now destroyed emitter 18.

Figure 5B:
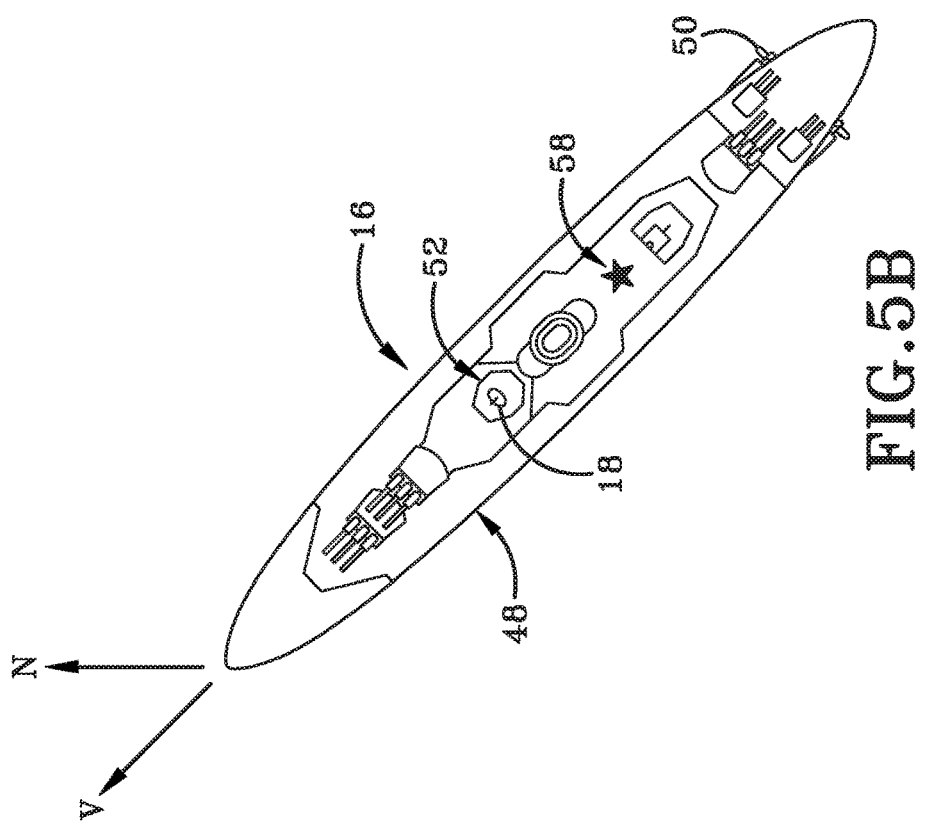
FIG. 5B is an alternate top elevation view of an embodiment of a target in accordance with one aspect of the present disclosure.
Figure 5A:
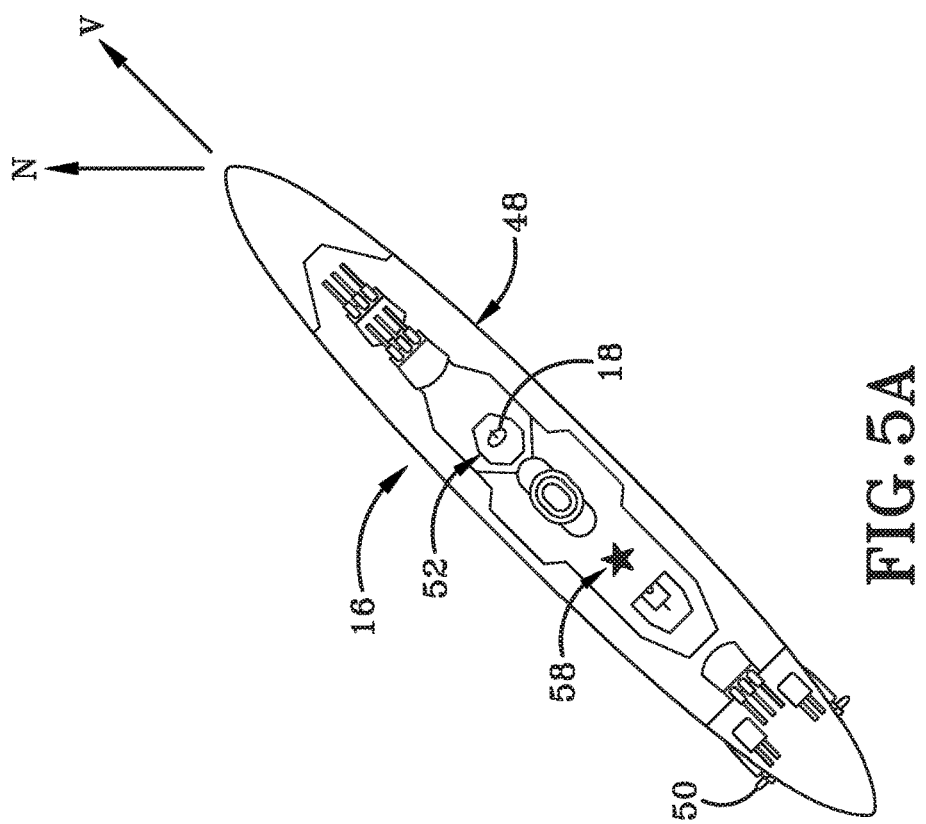
FIG. 5A is a top elevation view of an embodiment of a target in accordance with one aspect of the present disclosure.

Accordingly, it is desirable for one or more of the LRASMs 12A-C to hit target 16 in an area remote from the emitter 18 while maintaining a high level of accuracy to prevent munitions loss and/or failed target engagement. The determination of geolocation produced by AOA and TDOA can give a position and velocity of the emitter 18. However, as illustrated in FIGS. 5A and 5B, the position of the desired POI 58 on target 16 may not coincide with the position of the emitter 18. Further, as a ship is a mobile target 16 and is constantly moving, direction of the target 16 can change and is likely to change once the LRASMs 12A-C have been launched and are detected by the target 16.

Prior to launching the LRASMs 12A-C, when enemy target 16 is detected, or more particularly, when a signal 54 from enemy target 16 is detected, the signal data can be used to generate a target profile through comparison of the detected signal 54 properties and known target information to a database of expected signal characteristics and a database of known target 16 information having configurations prepopulated therein. The target profile may then be communicated to each of LRASMs 12A-C. According to one aspect, the target profile can be a single database containing both expected signal characteristics and target 16 information. The database can then provide a POI 58 remote from emitter 18 relative to the position of the emitter 18 on target 16. By way of one non-limiting example, a signal 54 can be detected and advanced intelligence can provide a target 16 profile indicating that an enemy ship of known configuration is operating in a restricted area. The nationality, model, and specific class of the ship can be compared to the database and the location of the emitter 18 positioned thereon can be determined relative to the desired POI 58. For example, the communications structure 52 may be located on the bow of the detected ship while the target 16 is the engine room or fuel storage compartments which may be located at the stern. This information can be communicated to LRASMs 12A-C prior to launch from firing platform 10, thus predetermining the POI 58 on target 16 relative to the emitter 18. Then, once LRASMs 12A-C are launched from firing platform 10, they can actively and continuously detect signal 54 coming from target emitter 18 on target 16 and can adjust their course heading and/or speed according the heading and velocity of the emitter 18 accounting for the offset POI 58 that was predetermined prior to firing. This offset POI process may allow for continuous and systematic calculation of the POI 58 relative to the emitter 18 location, heading, and velocity, and can allow LRASMs 12A-C to maintain a flight path directed to the POI 58 spaced apart from the emitter 18.

Accordingly, changes in velocity and heading of target 16 during flight time of LRASMs 12A-C may further allow calculation and prediction of the geolocation of the POI 58 at the time LRASMs 12A-C arrive on target 16, thus increasing accuracy of LRASMs 12A-C. The communications link 46 between LRASMs 12A-C may also allow LRASMs 12A-C to remain on course to arrive at the desired point of impact simultaneously, thus increasing the likelihood of a successful target engagement and reducing the effectiveness of any available countermeasures deployed by the target 16.

Figure 6:
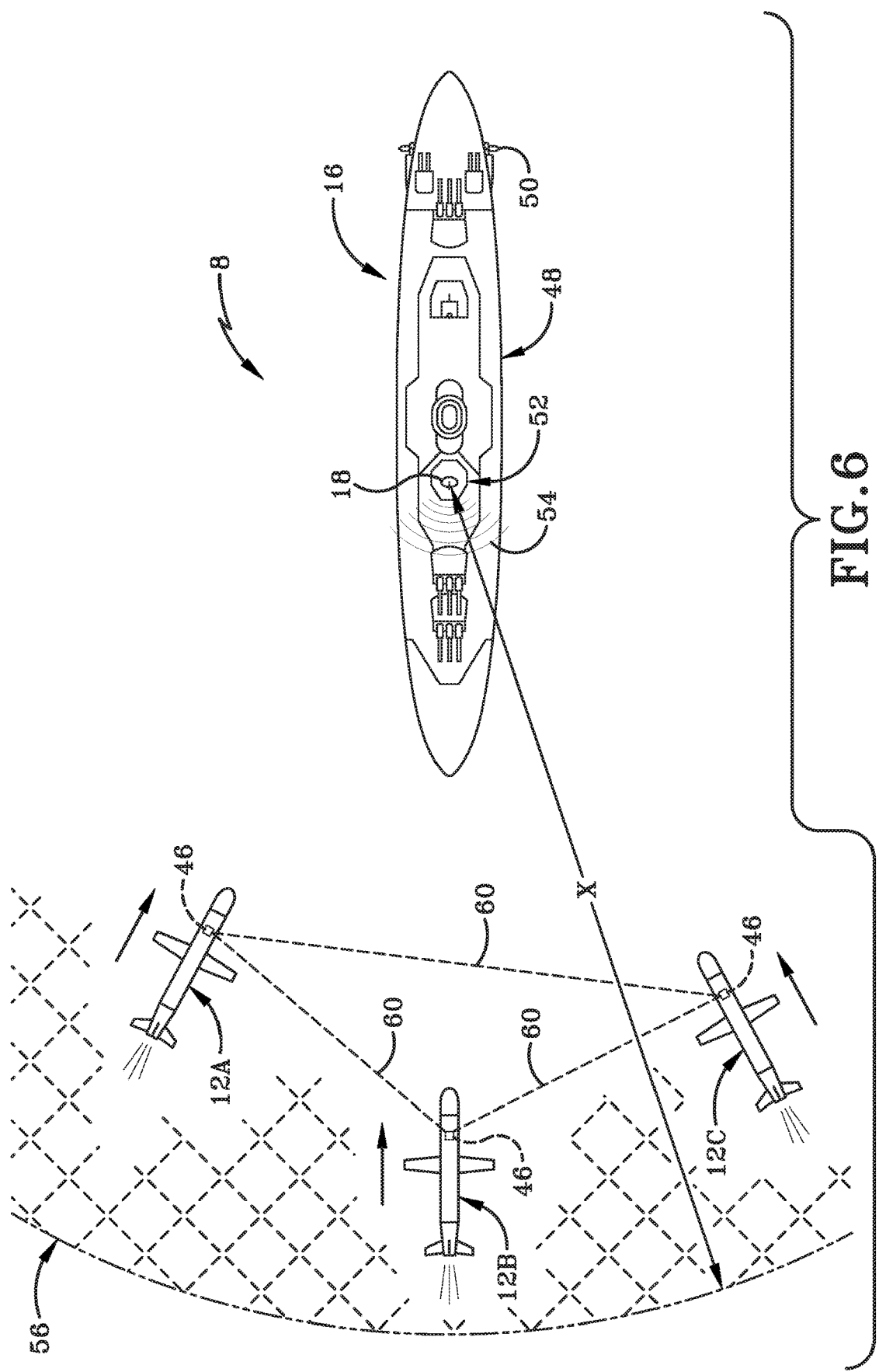
FIG. 6 is a top elevation view of an embodiment in accordance with one aspect of the present disclosure utilizing three cruise missiles in an area of GPS denial.

With reference to FIG. 6, an additional advantage of firing multiple LRASMs 12A-C that are in secure communications amongst themselves relates to navigation system drift experienced by LRASMs 12 operating in areas where GPS navigation is unavailable or denied. One common defensive countermeasure of a target 16 is to surround itself with a GPS jamming signal indicated in FIG. 6 as reference 56 and hereinafter referred to as the zone of GPS denial or the GPS denial zone 56. According to one embodiment, the GPS denial zone 56 can extend 360 degrees around a target 16, thus providing a circle of GPS denial zone 56 surrounding target 16 having a radius of 'X'. According to one aspect, radius X can be as large as 20 nautical miles. In single missile systems, when entering the zone of GPS denial 56, each LRASM 12 may rely on an unaided inertial navigation system, specifically components such as accelerometers and gyroscopes which may form a part of internal guidance system 14. It is known that navigation using accelerometers and gyroscopes alone results in a missile position error that grows with time. Specifically, missiles navigation using these systems alone may drift out of position in the magnitude of multiple miles. Thus, according to this embodiment and example, the final 20 nautical miles of approach distance to target 16 can result in significant drifting of LRASMs 12A-C such that target 16 is not struck at the desired POI 58 and reduces the probability of a successful target 16 engagement.

The present system 8 can utilize the secure communications link 46 between LRASMs 12A-C to continuously update each individual LRASM 12A-C of the position of each of the other two LRASMs 12A-C in the swarm. Using this knowledge of the relative position of each LRASM 12A-C, a swarm-relative geolocation solution can be calculated that is impervious to the independent drift of each missile's navigation system. The swarm-relative geolocation solution may allow LRASMs 12A-C to maintain their course to the target 16, and may increase the likelihood of a successful engagement of target 16.

Specifically, the LRASMs 12A-C can measure the transmission time and receive time of the data 60 as it is communicated between them. This data 60, like signal 54, is transmitted as a form of electromagnetic radiation, thus traveling at the speed of light. Further, knowledge of the data transmit and receive times together with the signal travel speed allows the distance between the transmitting LRASM 12 and the receiving LRASM 12 to be calculated. Knowledge of relative missile position is necessary for swarm-relative geolocation in a GPS denied environment. Knowledge of relative position may also allow LRASMs 12A-C to adjust their flight path and/or speed to keep LRASMs 12A-C in a specific formation as they approach the target 16. The formation may be further adjusted as LRASMs 12A-C approach the target 16. For example, if flying in a triangular configuration similar to the examples illustrated in the figures, LRASMs 12A-C may maintain their relative position while they continue to reduce the relative size of the triangle as they approach the target 16 until they meet at the POI 58.

Figure 7:
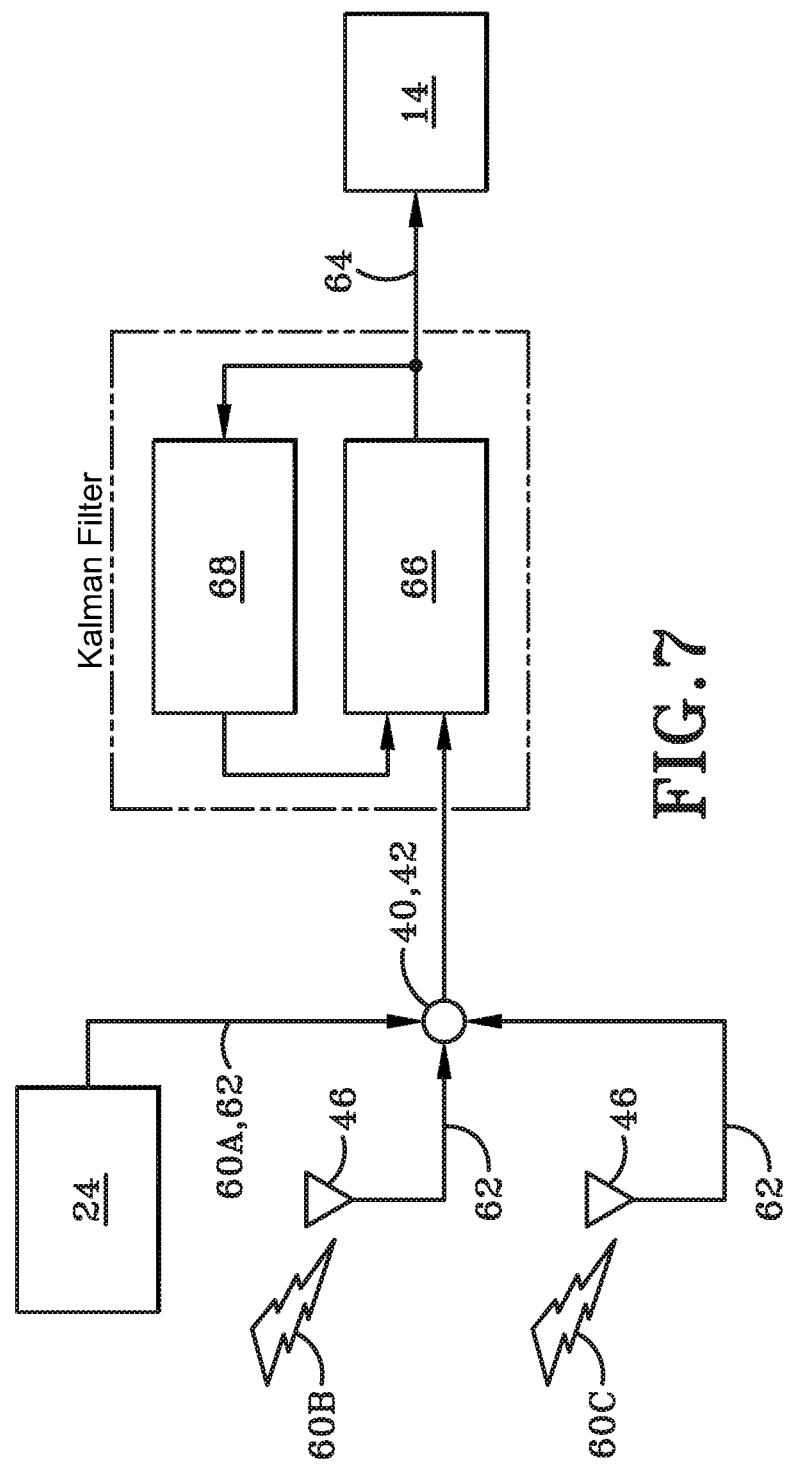
FIG. 7 is a block diagram of the processing that may occur on a single cruise missile in accordance with one aspect of the present disclosure.

With reference now to FIG. 7, the onboard processing performed by one of the LRASMs 12A-C is shown in the form of a block diagram, and further explained herein. As depicted in FIG. 7, the processing is shown from the perspective of LRASM 12A, with data 60 being received from LRASMs 12B and 12C (indicated as 60B and 60C respectively). Although shown with reference to LRASM 12A, the processing depicted in FIG. 7 may be identically replicated on each of LRASMs 12A-C. Further, the onboard processing shown in FIG. 7 may be identical in form whether the individual LRASM 12 is operating in an environment with GPS or in a GPS denied environment, however, the inputs 62 to computer 40 and subsequently to processor 42, and the output 64 from processor 42 to internal guidance system 14 may differ depending on the GPS availability in the particular environment, as discussed further herein.

Prior to processing measurements, the Kalman filter state vector and covariance matrix must be initialized. The Kalman filter states are latitude, longitude, north velocity, and east velocity of the target, where "target" here is defined as the desired impact point on the target. These states may be initialized using the AOA data from any one of the LRASM 12, or if AOA data is not available, the estimated target position provided to the missiles at launch. The Kaman filter covariance matrix is initialized using the uncertainties associated with the state initialization data. This initialization of the Kalman filter need only be performed once. Once initialized, the Kalman filter estimates of target location and velocity can be updated each time AOA and TDOA measurement values become available.

The following paragraphs discuss the processing performed onboard the LRASMs 12A-C if operating in environments where accurate missile positions are known (e.g. when GPS is available). The processing for environments where GPS is denied or otherwise unavailable is discussed separately below.

The first LRASM 12A may detect a signal 54 from emitter 18 via the sensor array 24, and data 60A may be sent to computer 40/processor 42 via inputs 62. These data 60A may include the elevation angle and azimuth angle measurements (AOA) from LRASM 12A to emitter 18, as well as the time of arrival (TOA) of signal 54 at LRASM 12A. Simultaneously, or in succession, communications link 46 may receive data 60B from LRASM 12B and data 60C from LRASM 12C and may send these data 60B, 60C to computer 40 via inputs 62 as well. Similar to the data 60A from LRASM 12A, data 60B and 60C may include the elevation angle and azimuth angle measurements from LRASMS 12B and 12C to emitter 18, as well as the TOA of signal 54 at LRASMs 12B and 12C.

These data 60A-60C may be provided to the Kalman filter hosted on computer 40 to estimate target position (latitude and longitude) and impact point velocity components (north and east velocity). The Kalman filter uses its state estimate to generate expected values for the AOA measurements. The expected values are subtracted from the measured values to obtain the measurement residuals. These measurement residuals are used together with the Kalman gain matrix to update the Kalman filter state estimate and covariance matrix.

The TDOA measurements may be calculated from data 60A-C by subtracting the various TOA measurements from each other. This results in TDOA measurements between first and second LRASMs 12A and 12B, between second and third LRASMs 12B and 12C, and between first and third LRASMs 12A and 12C. The Kalman filter uses its state estimate to generate expected values for the TDOA measurements. The expected values are subtracted from the measured values to obtain the measurement residuals. These measurement residuals are used together with the Kalman gain matrix to update the Kalman filter state estimate and covariance matrix.

After each AOA and/or TDOA measurement update is performed, the Kalman filter propagates the state estimates forward in time to obtain estimates of the target location and velocity at the next measurement time. In a similar fashion, the Kalman filter propagates the state covariance matrix forward in time to obtain uncertainties for the propagated state estimates.

The Kalman filter equations for use when accurate missile positions are known (e.g. when GPS is available) and are described below, with state propagation and measurement update equations represented in FIG. 7 by reference 66 and measurement equations represented in FIG. 7 by reference 68.

State Propagation and Measurement Update

The following equations may be used to propagate the Kalman filter states forward in time:

$$\hat{x}_{K+1} = \begin{bmatrix} 1 & 0 & A & 0 \\ 0 & 1 & 0 & B \\ 0 & 0 & 1 & 0 \\ 0 & 0 & 0 & 1 \end{bmatrix} \begin{bmatrix} \hat{\phi}_{target} \\ \hat{\lambda}_{target} \\ \hat{v}_{N\,target} \\ \hat{v}_{E\,target} \end{bmatrix}_k + Q_k$$

$M_e = f(\hat{\phi}_{target}) =$ meridian radius of curvature $N_e = f(\hat{\phi}_{target}) =$ prime vertical radius of curvature $$A = \left(\frac{\Delta t}{M_e}\right)$$

$$B = \left(\frac{\Delta t}{N_e \cos(\hat{\phi}_{target})}\right)$$

Where the state vector 2 is defined as:
$\hat{\phi}_{target}$=estimated target latitude
$\hat{\lambda}_{target}$=estimated target longitude
$\hat{v}_{N\,target}$=estimated target velocity along north direction
$\hat{v}_{E\,target}$=estimated target velocity along east direction Measurement Kalman filter state estimates (item a) may be used together with other available information (items b through d) to compute expected values for the following measurements:

$$\hat{z} = \begin{bmatrix} az_1 \\ az_2 \\ az_3 \\ el_1 \\ el_2 \\ el_3 \\ TDOA_{12} \\ TDOA_{13} \\ TDOA_{23} \end{bmatrix} \text{ where...}$$

$az_n =$ azimuth angle from missile$_n$ to emitter $el_n =$ elevation angle from missile$_n$ to emitter $TDOA_{12} =$ Signal time difference of arrival between missile 1 and missile 2

$TDOA_{13} =$ Signal time difference of arrival between missile 1 and missile 3

$TDOA_{23} =$ Signal time difference of arrival between missile 2 and missile 3 a) Kalman state filter estimates:

$$\hat{x} = \begin{bmatrix} \hat{\phi}_{target} \\ \hat{\lambda}_{target} \\ \hat{v}_{N\,target} \\ \hat{v}_{E\,target} \end{bmatrix} \text{ where...}$$

$\hat{\phi}_{target} =$ estimated target latitude

-continued $\hat{\lambda}_{target}$ = estimated target longitude $\hat{v}_{N\,target}$ = estimated target velocity along north direction $\hat{v}_{E\,target}$ = estimated target velocity along east direction b) Position of each missile in geodetic coordinate frame (n=1 to 3):
$\phi_{missile\ n}$=latitude of missile n
$\lambda_{missile\ n}$=longitude of n
$alt_{missile\ n}$=altitude of missile n
c) Target altitude:
$alt_{target}$=fixed target altitude
d) Emitter position relative to target in ship coordinate frame:

$\Delta x_{emit}$=x distance from target to emitter in ship coordinate frame $\Delta y_{emit}$=y distance from target to emitter in ship coordinate frame $\Delta z_{emit}$=vertical distance from target to emitter in ship coordinate frame The steps for calculating expected measurements are as follows:

Step 1: Calculate the target heading in the geodetic coordinate frame:

$$\varphi_{ship} = \sin^{-1}\left(\frac{\hat{v}_E}{\sqrt{\hat{v}_N^2 + \hat{v}_E^2}}\right)$$

Step 2: Calculate position of target emitter in geodetic coordinate frame:

$\phi_{emit}=f(\varphi_{ship},\Delta x_{emit},\Delta y_{emit},\hat{\phi},\hat{\lambda})$ $\lambda_{emit}=f(\varphi_{ship},\Delta x_{emit},\Delta y_{emit},\hat{\phi},\hat{\lambda})$ $alt_{emit}=alt_{target}-\Delta z_{emit}$ Step 3: For each missile, (where n=1 to 3) calculate:
a) Azimuth angle from missile to emitter:

$az_n=f(\phi_{emit},\lambda_{emit},alt_{emit},\phi_{missile\ n},\lambda_{missile\ n},alt_{missile\ n})$ b) Elevation angle from missile to emitter:

$el_n=f(\phi_{emit},\lambda_{emit},alt_{emit},\phi_{missile\ n},\lambda_{missile\ n},alt_{missile\ n})$ c) Distance from missile to emitter:

$distance_n=f(\phi_{emit},\lambda_{emit},alt_{emit},\phi_{missile\ n},\lambda_{missile\ n},alt_{missile\ n})$ Step 4: Calculate TDOA for each missile baseline:

$$TDOA_{12} = \frac{distance_1 - distance_2}{speed\ of\ light}$$

$$TDOA_{13} = \frac{distance_1 - distance_3}{speed\ of\ light}$$

$$TDOA_{23} = \frac{distance_2 - distance_3}{speed\ of\ light}$$

The output 64 of the Kalman filter, namely the estimated target location and velocity in the geodetic frame, may be provided to internal guidance system 14 to allow for the appropriate adjustments to the flight path and/or speed of LRASMs 12A-C.

Although discussed above in a specific order, it will be understood that the determination of AOA and TDOA of an incoming signal 54 can be performed in any order, including determining AOA then TDOA, determining TDOA then AOA, or determining AOA and TDOA simultaneously.

As stated previously, the term "target" in the equations above is defined as the desired impact point on the target. The Kalman filter may thus estimate the geodetic (earth) frame position of the desired point of impact, even though it may be offset from the target emitter. The offset POI processing assumes the desired point of impact is known in the target's 16 coordinate frame, but the heading of the target 16 coordinate frame is unknown with respect to the geodetic earth frame, as discussed above. This unknown target heading is what makes estimating the position of an offset emitter challenging. The Kalman filter algorithm above provides a robust solution.

The following paragraphs now discuss the processing performed onboard the LRASMs 12A-C when operating in environments where accurate missile position is unavailable (e.g. denied GPS environments).

With continued reference to FIG. 7, onboard processing performed by LRASMs 12A-C can have the same basic pathways regardless of the availability of a GPS signal. Specifically, even in GPS denied zone 56, the first LRASM 12A may detect a signal 54 from emitter 18 via the sensor array 24, and data 60A may be sent to computer 40/processor 42 via inputs 62. These data 60A may include an estimated elevation angle and azimuth angle measurement from LRASM 12A to emitter 18. The elevation and azimuth angles measured relative to LRASM 12A are still accurate despite errors in the LRASM 12A position. Data 60A may also include the TOA of signal 54 at LRASM 12A. As before, simultaneously, or in succession, communications link 46 may receive data 60B from LRASM 12B and data 60C from LRASM 12C, including estimated elevation angle and azimuth angle measurements from LRASMs 12B and 12C to emitter 18, as well as TOA of signal 54 at LRASMs 12B and 12C.

The Kalman filter processing between the two environments (i.e. GPS available and GPS denied/unavailable) is very similar. However, the states the filter estimates are different. When the missile positions are known accurately (e.g. GPS available), the Kalman filter estimates the target location in the geodetic earth frame. The Kalman filter states are latitude, longitude, north velocity, and east velocity. Using this information, the target location could be pinpointed on a map. When the missile locations are not known accurately (e.g. GPS denied), the Kalman filter estimates the target location relative to a LRASM 12 chosen as the origin of the missile swarm coordinate reference frame. The Kalman filter position states are azimuth, elevation, and range to the target with respect to the chosen LRASM 12. In addition to the position states, the Kalman filter estimates azimuth rate, elevation rate, and range rate. Since this information is relative to a missile with unknown position in the earth frame, it is not possible to pinpoint the target on a map. However, the target position is known in the swarm frame, and this is sufficient for each LRASM 12 to guide itself to impact with the target.

When operating in a GPS denied environment (and only when operating in a GPS denied environment), the present navigation system 8 requires that the relative position between the LRASMs 12A-C be known. Specifically, as discussed above and in keeping with the example of LRASM 12A as the processing missile, when data 60B and 60C are sent from LRASMs 12B and 12C, the time the data 60 is transmitted by communications link 46 on LRASM 12B and 12C may be recorded, and LRASM 12A may further record the TOA for data 60 as it is received by communications link 46 on LRASM 12A. Having this information, along with the estimated elevation and azimuth angles and TOA of signal 54 at each LRASM 12A-C, may allow the relative position of each LRASM 12A-C to be calculated, which in turn can compensate for the lack of specific knowledge of the actual position of each LRASM 12A-C. The LRASMs 12A-C may maintain a desired formation or position as they approach target 16.

The Kalman filter equations for use when accurate missile positions are unknown (such as GPS denial zone 56) are described below, with state propagation and measurement update equations represented in FIG. 7 by reference 66 and measurement equations represented in FIG. 7 by reference 68.

State Propagation and Measurement Update

The following equations may be used in areas where GPS is denied or unavailable to propagate Kalman filter states forward in time:

$$\hat{x}_{K+1} = \begin{bmatrix} 1 & 0 & \Delta t & 0 \\ 0 & 1 & 0 & \Delta t \\ 0 & 0 & 0 & 0 \\ 0 & 0 & 0 & 0 \end{bmatrix} \begin{bmatrix} \widehat{az}_{target} \\ \widehat{el}_{target} \\ \widehat{\dot{az}}_{target} \\ \widehat{\dot{el}}_{target} \end{bmatrix}_k + Q_k$$

Where the state vector $\hat{x}$ is defined as:

$\widehat{az}_{target}$=estimated azimuth angle to target $\widehat{el}_{target}$=estimated elevation angle to target $\widehat{\dot{el}}_{target}$=estimated azimuth angle rate of change $\widehat{\dot{az}}_{target}$=estimated elevation angle rate of change Measurement Kalman filter state estimates (item a) may be used together with other available information (items b through e) to compute expected values for the following measurements:

$$\hat{z} = \begin{bmatrix} az \\ el \\ TDOA_{12} \\ TDOA_{13} \\ TDOA_{23} \end{bmatrix} \text{ where\ldots}$$

$az$ = azimuth angle from missile to emitter $el$ = elevation angle from missile to emitter $TDOA_{12}$ = Signal time difference of arrival between missile 1 and missile 2

$TDOA_{13}$ = Signal time difference of arrival between missile 1 and missile 3

$TDOA_{23}$ = Signal time difference of arrival between missile 2 and missile 3 a) Kalman state filter estimates:

$$\hat{x} = \begin{bmatrix} \widehat{az}_{target} \\ \widehat{el}_{target} \\ \widehat{\dot{az}}_{target} \\ \widehat{\dot{el}}_{target} \end{bmatrix} \text{ where\ldots}$$

$\widehat{az}_{target}$ = estimated azimuth angle to target $\widehat{el}_{target}$ = estimated elevation angle to target $\widehat{\dot{el}}_{target}$ = estimated azimuth angle rate of change $\widehat{\dot{az}}_{target}$ = estimated elevation angle rate of change b) Position of each missile 1:

$\phi_{missile\ 1}$=latitude of missile 1

$\lambda_{missile\ 1}$=longitude of missile 1

$alt_{missile\ 1}$=altitude of missile 1 c) Target altitude and ship heading:

$alt_{target}$=fixed target altitude $\phi_{ship}$=ship heading relative to north d) Emitter position relative to target in ship coordinate frame:

$\Delta x_{emit}$=x distance from target to emitter in ship coordinate frame $\Delta y_{emit}$=y distance from target to emitter in ship coordinate frame $\Delta z_{emit}$=vertical distance from target to emitter in ship coordinate frame e) Position of missiles 2 and 3 relative to missile 1:

$pos_{12}$=position of missile 2 relative to position 1

$pos_{13}$=position of missile 3 relative to position 1

Steps for calculating expected measurements:

Step 1: Calculate azimuth and elevation angles to target:

$az = \widehat{az}_{target}$ $el = \widehat{el}_{target}$

Step 2: Calculate target latitude and longitude:

$\phi_{target} = f(\phi_{missile\ 1}, \lambda_{missile\ 1}, alt_{missile\ 1}, \widehat{az}_{target}, \widehat{el}_{target})$ $\lambda_{target} = f(\phi_{missile\ 1}, lon_{missile\ 1}, alt_{missile\ 1}, \widehat{az}_{target}, \widehat{el}_{target})$ Step 3: Calculate emitter position:

$\phi_{emit} = f(\phi_{ship}, \Delta x_{emit}, \Delta y_{emit}, \phi_{target}, lon_{target})$ $\lambda_{emit} = f(\phi_{ship}, \Delta x_{emit}, \Delta y_{emit}, \phi_{target}, lon_{target})$ $alt_{emit} = target_{altitude} + emitter_{1altitude}$ Step 4: Calculate position of missile 2 and 3 (n=2 to 3):

$\phi_{missile\ n} = f(pos_{1n}, \phi_{missile\ 1}, \lambda_{missile\ 1})$ $\lambda_{missile\ n} = f(pos_{1n}, \phi_{missile\ 1}, \lambda_{missile\ 1})$ $alt_{missile\ n} = f(pos_{1n}, \phi_{missile\ 1}, \lambda_{missile\ 1})$ Step 5: Calculate distance to emitter from each missile (n=1 to 3):

$$distance_n = f(lat_{emit}, lon_{emit}, alt_{emit}, \phi_{missile\ n}, \lambda_{missile\ n}, alt_{missile\ n})$$

Step 6: Calculate TDOA for each missile baseline:

$$TDOA_{12} = \frac{distance_1 - distance_2}{speed\ of\ light}$$

$$TDOA_{13} = \frac{distance_1 - distance_3}{speed\ of\ light}$$

$$TDOA_{23} = \frac{distance_2 - distance_3}{speed\ of\ light}$$

The output 64 of the Kalman filter, namely the estimated target azimuth, elevation, and range relative to the reference LRASM 12, may be provided to internal guidance system 14 to allow for the appropriate adjustments to the flight path and/or speed of LRASMs 12A-C.

Having thus described the operation, a navigation method for multiple missiles fired at a common target is now provided. The method, including launching three or more LRASMs 12A-C from a firing platform 10 at a target 16 that is remote from the firing platform 10. Once launched, the three or more LRASMs 12A-C can detect an incoming signal 54 from an emitter 18 collocated with the target 16. Each LRASM 12A-C can independently detect the signal data and can determine an AOA for the signal relative to the LRASMs 12A-C. The swarm of three or more LRASMs 12A-C can further determine the TOA of the signal 54 relative to the LRASMs 12A-C. These data may then be transmitted to a centralized location and/or between each of the LRASMs 12A-C to determine a geolocation of the target 16 based on both the AOA and TOA of the detected signal 54. The flight path and/or speed of each of the three or more LRASMs 12A-C can then be adjusted based on continuing detection of the signal 54 and calculation of the geolocation of the signal 54.

In instances where the desired POI 58 is remote from the emitter 18, the method of navigation can further include creating a target 16 profile prior to launching the three or more LRASMs 12A-C from firing platform 10 and comparing the target 16 profile to a database of known target 16 types and configurations to determine the desired POI 58. This target 16 profile and POI 58 can be communicated to the three or more LRASMs 12A-C prior to launching from the firing platform 10. Then, in flight, the LRASMs 12A-C may utilize the target 16 profile and POI 58 along with the AOA and TOA to maintain a flight path and speed that can allow each of the three or more LRASMs 12 to arrive at the desired POI 58, offset from the emitter 18, at the same time.

When the target 16 employs a GPS jammer, or when GPS data is otherwise unavailable, navigation to the target can still be achieved despite unknown earth relative missile positions. The navigation approach requires the relative positions between the LRASMs 12 to be known. This requirement is met via secure communications between each of the three or more LRASMs 12A-C. These communications can be sent at regular intervals between each of the LRASMs 12A-C. By way of non-limiting example, communication can be sent between the first and second LRASMs 12A and 12B, the first and third LRASMs 12A and 12C, and the second and third LRASMs 12B and 12C at an interval of once per second. The LRASMs 12A-C can then calculate the time it took for communications to arrive from each of the other LRASMs 12A-C, and can use that time calculation to determine the relative distance between LRASMs 12A-C.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of projectile navigation comprising:
   detecting an incoming signal originating from an emitter carried by a target, wherein the incoming signal is independently detected by each of at least three projectiles that are operable to travel to and impact the target;
   analyzing the incoming signal via a processor and at least one non-transitory storage medium carried by at least one of the at least three projectiles to provide the angle of arrival (AOA) for the incoming signal relative to the location of each projectile;
   analyzing the incoming signal via the processor and at least one non-transitory storage medium to provide the time of arrival (TOA) of the incoming signal relative to the location of each projectile;
   communicating the AOA and TOA between the at least three projectiles; and
   determining the geolocation of the target based on the AOA and TOA of the incoming signal.

2. The method of claim 1 wherein the at least three projectiles are three long-range anti-ship missiles (LR-ASMs).

3. The method of claim 1 wherein analyzing the detected signal data to provide the AOA further comprises:
   applying a correlative interferometry direction finding (CIDF) process to the incoming signal data to provide the AOA of the detected signal.

4. The method of claim 1 wherein determining the geolocation of the target based on the AOA and TOA of the incoming signal comprises:
   processing the AOA and TOA measurements with at least one Kalman filter to geolocate the target.

5. The method of claim 1 further comprising:
   adjusting at least one of the flight path and flight speed of one or more of the at least three projectiles based on the geolocation of the target.

6. The method of claim 1 further comprising:
   simultaneously analyzing the incoming signal data to provide the AOA and TOA.

7. The method of claim 1 further comprising:
   independently analyzing the incoming signal data to provide the AOA and TOA in any order.

8. The method of claim 1 further comprising:
   creating a profile of the target prior to launching the projectiles.

9. The method of claim 8 further comprising:
   comparing the profile to a database of known target types and configurations to determine a point of impact on the target relative to and offset from the location of the signal emitter carried by the target.

10. The method of claim 9 further comprising:
    communicating the target profile, target configuration, and point of impact to the projectiles.

11. The method of claim 1 further comprising:
    determining a direction of travel and speed of the target based on the AOA and TOA of the detected signal and the geolocation of the target.

12. The method of claim 1 wherein each of the projectiles navigate by unaided inertial navigational systems in areas where global positioning system (GPS) data is unavailable or denied.

13. The method of claim 12 further comprising:
    measuring one or both of the transmission and receiving times of communication pulse transmissions between the projectiles.

14. The method of claim 13 further comprising:
    comparing the transmission and receiving times of communication pulse transmissions between the projectiles; and
    determining the position of each of the projectiles relative to each of the other projectiles.

15. The method of claim 14 further comprising:
    adjusting at least one of the flight path and flight speed of at least one of the projectiles to allow each of the projectiles to arrive at the target at approximately the same time.

16. A system comprising:
    at least one non-transitory computer readable storage medium having instructions encoded thereon that, when executed by a processor, implements operations to direct the operations of at least three projectiles, the instructions including:
    detect an incoming signal originating from an emitter carried by the target, wherein the incoming signal is independently detected by each of the projectiles;
    analyze the incoming signal to provide the angle of arrival (AOA) for the incoming signal relative to the location of each projectile;

analyze the incoming signal to provide the time of arrival (TOA) of the incoming signal relative to the location of each projectile;

communicate the AOA and TOA between the at least three projectiles; and determine the geolocation of the target based on the AOA and TOA of the incoming signal.

17. The system of claim 16 wherein the instructions further include:

apply a correlative interferometry direction finding (CIDF) process to the incoming signal data to provide the AOA of the detected signal;

process the AOA and TOA measurements with at least one Kalman filter to geolocate the target;

create a profile of the target;

compare the profile to a database of known target types and configurations to determine a point of impact on the target relative to and offset from the location of the signal emitter carried by the target;

communicate the target profile, target configuration, and point of impact to the projectiles;

determine a direction of travel and speed of the target based on the AOA and TOA of the detected signal and the geolocation of the target;

measure one or both of the transmission and receiving times of communication pulse transmissions between the projectiles;

compare the transmission and receiving times of communication pulse transmissions between the projectiles; and determine the position of each of the projectiles relative to each of the other projectiles.

18. The system of claim 17 wherein the instructions further include:

adjusting at least one of the flight path and flight speed of at least one of the projectiles to allow each of the projectiles to arrive at the target at approximately the same time based on one or more of the target's geolocation, the target's direction of travel and speed, and the position of each of the projectiles relative to each of the other projectiles.

19. A computer program product including one or more non-transitory machine-readable mediums encoding instructions that when executed by one or more processors cause a process to be carried out for directing at least three projectiles, the process comprising:

detecting an incoming signal originating from an emitter carried by the target, wherein the incoming signal is independently detected by the projectiles;

analyzing the incoming signal to provide the angle of arrival (AOA) for the incoming signal relative to the location of each projectile;

analyzing the incoming signal to provide the time of arrival (TOA) of the incoming signal relative to the location of each projectile;

communicating the AOA and TOA between the at least three projectiles; and determining the geolocation of the target based on the AOA and TOA of the incoming signal.

20. The computer program product of claim 19 wherein the process further comprises:

apply a correlative interferometry direction finding (CIDF) process to the incoming signal data to provide the AOA of the detected signal;

process the AOA and TOA measurements with at least one Kalman filter to geolocate the target;

create a profile of the target;

compare the profile to a database of known target types and configurations to determine a point of impact on the target relative to and offset from the location of the signal emitter carried by the target;

communicate the target profile, target configuration, and point of impact to the projectiles;

determine a direction of travel and speed of the target based on the AOA and TOA of the detected signal and the geolocation of the target;

measure one or both of the transmission and receiving times of communication pulse transmissions between the projectiles;

compare the transmission and receiving times of communication pulse transmissions between the projectiles;

determine the position of each of the projectiles relative to each of the other projectiles; and adjusting at least one of the flight path and flight speed of at least one of the projectiles to allow each of the projectiles to arrive at the target at approximately the same time based on one or more of the target's geolocation, the target's direction of travel and speed, and the position of each of the projectiles relative to each of the other projectiles.

\* \* \* \* \*